US012544993B2

(12) United States Patent
Blom-Schieber

(10) Patent No.: US 12,544,993 B2
(45) Date of Patent: Feb. 10, 2026

(54) METHODS OF STAMP-FORMING FIBER-REINFORCED THERMOPLASTIC COMPOSITE ASSEMBLIES AND RELATED SYSTEMS

(71) Applicant: The Boeing Company, Arlington, VA (US)

(72) Inventor: Adriana W. Blom-Schieber, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 103 days.

(21) Appl. No.: 18/363,165

(22) Filed: Aug. 1, 2023

(65) Prior Publication Data

US 2025/0042107 A1 Feb. 6, 2025

(51) Int. Cl.
*B29C 70/70* (2006.01)
*B29C 35/08* (2006.01)
(Continued)

(52) U.S. Cl.
CPC .......... *B29C 70/70* (2013.01); *B29C 35/0805* (2013.01); *B29C 70/682* (2013.01); *B29C 2035/0822* (2013.01); *B29L 2031/082* (2013.01)

(58) Field of Classification Search
CPC ....... B29C 70/70; B29C 65/02; B29C 70/682; B29C 66/524; B29C 51/421; B29C 2035/0822; B64C 3/185
See application file for complete search history.

(56) References Cited

U.S. PATENT DOCUMENTS 5,066,536 A 11/1991 Cogswell et al.
9,216,812 B2 * 12/2015 Guinaldo Fernadez ..................... B64C 3/185
(Continued)

FOREIGN PATENT DOCUMENTS

EP 3858585 B1 3/2023

OTHER PUBLICATIONS

Smiley, A. J., et al. "Dual polymer bonding of thermoplastic composite structures." Polymer Engineering & Science 31.7 (1991): 526-532.
(Continued)

*Primary Examiner* — Michael A Tolin
*Assistant Examiner* — Hana C Page
(74) *Attorney, Agent, or Firm* — Kolitch Romano Dascenzo Gates LLP

(57) ABSTRACT

Stamp-forming a composite assembly includes applying a low-melt film on an interface surface of at least one spar, loading the spar onto at least one tooling segment such that the interface surface is exposed, and heating the tooling segment to a first temperature that is above a crystallization temperature of the low-melt film and below a melt temperature of a resin of the spar. A second low-melt film may be applied on a fiber-reinforced thermoplastic skin blank, and the skin blank is heated to a second temperature above a melt temperature of a resin of the skin blank. The skin blank is then draped around the tooling segment such that at least some of any second low-melt film contacts the low-melt film on the interface surface of the spar. The stamp press is then closed to co-consolidate the skin blank and the spar, thereby stamp-forming the composite assembly.

16 Claims, 9 Drawing Sheets

(51) Int. Cl.
    *B29C 70/68*         (2006.01)
    *B29L 31/08*         (2006.01)

(56) References Cited

U.S. PATENT DOCUMENTS

| | | | |
|---|---|---|---|
| 9,669,587 B2* | 6/2017 | Nelson | B29C 66/532 |
| 11,524,468 B2* | 12/2022 | Ward | B29C 70/32 |
| 2010/0170637 A1 | 7/2010 | Iannone | |
| 2014/0079903 A1 | 3/2014 | Hugon et al. | |
| 2015/0198388 A1 | 7/2015 | Anderson et al. | |
| 2015/0298388 A1* | 10/2015 | Wong | B29C 66/73921 |
| | | | 428/419 |
| 2022/0266541 A1 | 8/2022 | Shi et al. | |

OTHER PUBLICATIONS

Hollmann, Marc et al., "Next Generation of Large Thermoplastic Structural Components for the Aerospace Industry" presentation, International Conference & Exhibition on Thermoplastic Composites (ITHEC) 2022, Bremen, Germany (Oct. 13, 2022).
European Patent Office, Extended European Search Report in related application, No. EP 24 18 7041, Dec. 11, 2024.

\* cited by examiner

METHODS OF STAMP-FORMING FIBER-REINFORCED THERMOPLASTIC COMPOSITE ASSEMBLIES AND RELATED SYSTEMS

FIELD

The present disclosure relates generally to stamp-forming fiber-reinforced thermoplastic composite assemblies and more particularly to such methods involving co-consolidating skin and spars together.

BACKGROUND

Conventional methods of forming thermoplastic composite closed-contoured torsion boxes such as wing boxes for aircraft involve forming skins and spars separately, and then inserting the spars and fastening or welding them to the skin in a secondary step. Potential drawbacks of such techniques include the multiple steps needed to secure the spars to the skin, and the difficulty of inserting the spars in assemblies having a closed leading and trailing edge without resulting in tolerance issues in the final part.

SUMMARY

Disclosed methods may improve upon prior art techniques, such as by reducing the number of process steps for forming a composite assembly, such as a torsion box with closed leading and trailing edges. Generally, such methods involve forming a thermoplastic composite skin and co-consolidating the skin with pre-formed spars in a single stamp form action.

In a specific example, methods of stamp-forming a fiber-reinforced thermoplastic composite assembly according to the present disclosure may include applying a first low-melt film on at least one interface surface of at least one spar, wherein each spar of the at least one spar is formed of fiber-reinforced thermoplastic composite materials. The at least one spar may be loaded onto at least one tooling segment such that the at least one interface surface is exposed and facing away from the at least one tooling segment. The at least one tooling segment may be heated to a first temperature, with the first temperature being above a crystallization temperature of the first low-melt film and below a melt temperature of a thermoplastic spar resin of the at least one spar. A second low-melt film (which may be the same film material as the first low-melt film) may be applied to, coated with, or provided on a first side of a fiber-reinforced thermoplastic skin blank. As used herein, a thermoplastic composite skin laminate will be referred to as a "skin blank" when it is in a flat, or substantially unformed, state, and when it is pliable from heating and/or deconsolidating. Once the skin blank has been stamp-formed and consolidated, it will simply be referred to as a "skin." The skin blank may be heated to a second temperature above a melt temperature of a thermoplastic skin resin of the skin blank. In this manner, the skin blank and any second low-melt film on it may be heated to the point that the skin blank may draped or placed around the at least one tooling segment such that the first side of the skin blank faces an external surface of the at least one tooling segment. As the skin blank is so draped, at least some of any second low-melt film on the skin blank may be made to contact the first low-melt film on the at least one interface surface of the spar(s).

To stamp-form the composite assembly, a stamp press may be closed around the skin blank and the at least one tooling segment, to press the skin blank into the at least one tooling segment and to press at least some of any second low-melt film against the first low-melt film on the at least one interface surface of the spar(s). The skin blank and the at least one spar may be co-consolidated within the stamp press, to form a resulting fiber-reinforced thermoplastic composite assembly formed from the skin and spar(s). Once the co-consolidation is complete, the stamp press may be opened to remove the composite assembly and tooling segment from the stamp press. Resulting composite assemblies also are within the scope of the present disclosure. For example, resulting composite assemblies may be closed-contoured torsion boxes such as a wing tip, a winglet, a rotor blade for an unmanned aerial vehicle (UAV), a rotor blade for a helicopter tail rotor, a wing, an aileron, a flap, a rudder, and/or smaller control surfaces for UAVs, helicopters, or commercial airplanes.

Related systems for performing such methods also are within the scope of the present disclosure. Exemplary systems may include a plurality of tooling segments configured to position at least one pre-formed spar for a stamp-forming process, an infrared heater configured to heat a fiber-reinforced thermoplastic consolidated skin blank to a temperature above a film melting point of a low-melt film applied to the at least one pre-formed spar, a tensioning element configured to maintain tension on the skin blank as the skin blank is draped around the plurality of tooling segments such that the skin blank faces an external surface of the plurality of tooling segments, and a stamp press configured to be closed around the skin blank and the plurality of tooling segments, such that the stamp press is configured to press the skin blank onto the plurality of tooling segments and against the low-melt film on the at least one pre-formed spar to co-consolidate the skin blank with the at least one pre-formed spar, thereby forming the resulting fiber-reinforced thermoplastic composite assembly.

DESCRIPTION

Figure 1:
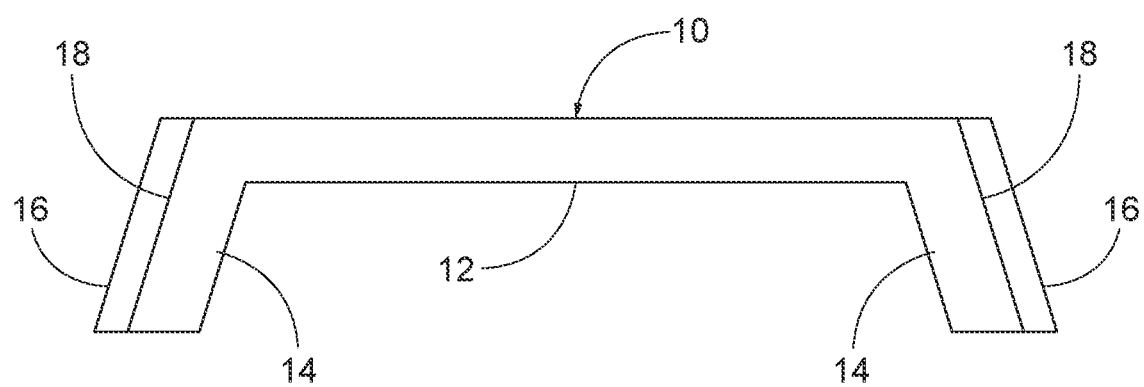
FIG. 1 is a schematic representation of non-exclusive examples of a spar having a low-melt film applied on an interface surface.

FIGS. 1-9 and 11-13 provide illustrative, non-exclusive examples of methods and systems for stamp-forming composite assemblies according to the present disclosure, and generally may not be drawn to scale. Elements that serve a similar, or at least substantially similar, purpose are labeled with like numbers in each of FIGS. 1-9 and 11-13, and these elements may not be discussed in detail herein with reference to each of FIGS. 1-9 and 11-13. Similarly, not all elements may be labeled in each of FIGS. 1-9 and 11-13, but reference numerals associated therewith may be utilized herein for consistency. Elements, components, and/or features that are discussed herein with reference to one or more of FIGS. 1-9 and 11-13 may be included in and/or utilized with any of FIGS. 1-9 and 11-13 without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

FIG. 1 shows a schematic representation of a side elevation view of a spar 10, which may be a pre-formed fiber-reinforced thermoplastic composite spar 10. Spar 10 generally includes an elongate portion 12, with two opposing flanges 14 extending from elongate portion 12 on either end of elongate portion 12. A first low-melt film 16 is present on an interface surface 18 of each flange 14, which, in this example, is an outer surface of each flange 14. First low-melt film 16 may be coated, applied, adhered, and/or laminated on to interface surfaces 18 of spars 10. First low-melt films 16 should be selected to be compatible with the resins used in the fiber-reinforced material used to make spars 10. First low-melt film 16 may be applied to interface surfaces 18 after pre-forming spars 10, before pre-forming spars 10, or at the time when spars 10 are pre-formed. Examples of suitable low-melt films may be amorphous or semi-crystalline, and are disclosed in U.S. Patent Application Publication No. 2022-0266541, the entire disclosure of which is incorporated by reference herein.

Figure 3:
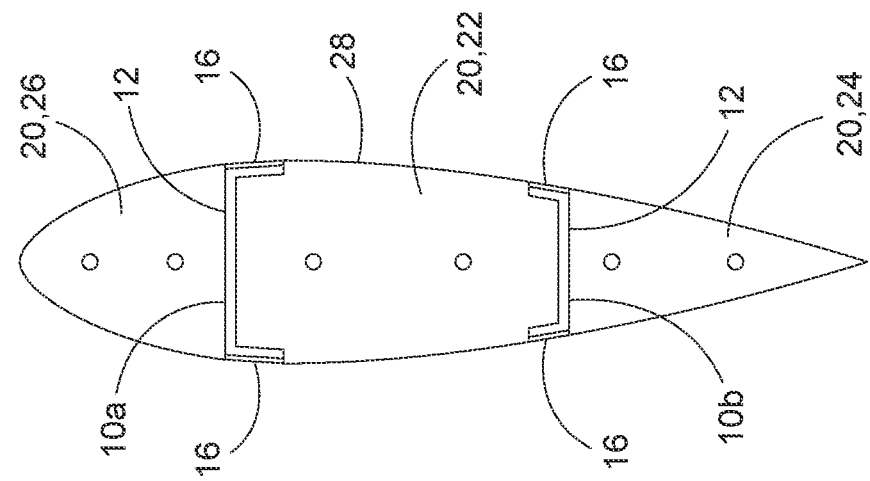
FIG. 3 is a schematic representation of a plurality of tooling segments that have been closed together, to sandwich or clamp respective spars between respective adjacent tooling segments.
Figure 2:
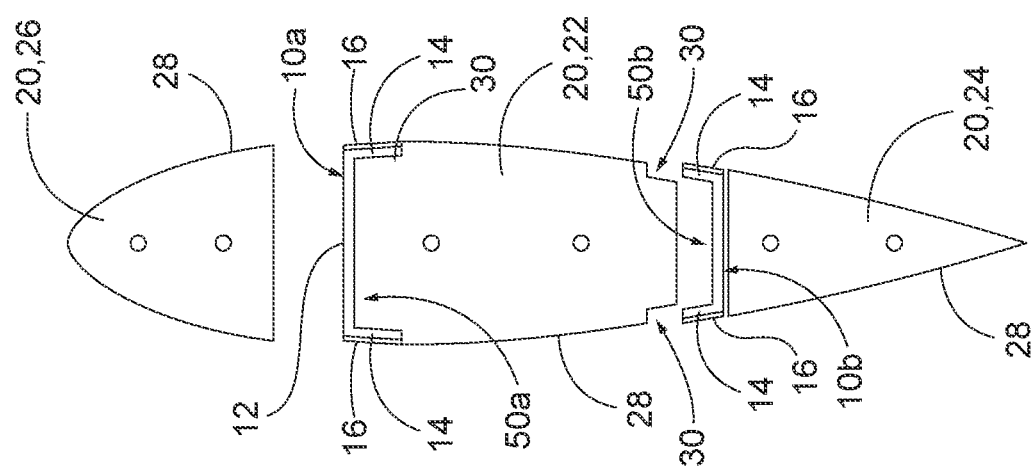
FIG. 2 is a schematic, exploded representation of a plurality of tooling segments with a plurality of spars engaged therewith.

FIG. 2 shows a schematic representation of a side elevation view of a plurality of tooling segments 20 that may be configured to serve as a mold for creating a co-consolidated thermoplastic composite assembly. For example, FIG. 2 illustrates the plurality of tooling segments 20 with a first tooling segment 22, a second tooling segment 24, and a third tooling segment 26, though in other examples, the plurality of tooling segments 20 may include more or fewer tooling segments 20. Additionally or alternatively, one or more tooling segments each may be formed of a plurality of pieces engaged with one another. Tooling segments 20 may be configured to be assembled together, or engaged with one another when in use for stamp-forming composite parts. As best seen in FIG. 3, when tooling segments 20 are assembled together, an external surface 28 of the combined tooling segments 20 may form an airfoil, or teardrop, shape, though other shapes also are within the scope of the present disclosure.

With continued reference to FIGS. 2 and 3, tooling segments 20 may be configured to receive, support, and/or position one or more spars 10 with respect to one another. For example, tooling segments 22, 24, 26 are configured to receive, support, and position two spars 10 (e.g., first spar 10a and second spar 10b), though in other examples, more or fewer spars 10 may be used. In the illustrated example, first spar 10a may be positioned on first tooling segment 22, and sandwiched, or clamped, between first tooling segment 22 and third tooling segment 26 when tooling segments 20 are brought together (e.g., in the configuration shown in FIG. 3). Second spar 10b may be positioned on first tooling segment 22 opposite from first spar 10a, and may be sandwiched or clamped between first tooling segment 22 and second tooling segment 24 when tooling segments 20 are brought together as shown in FIG. 3. When so positioned on tooling segments 20, spars 10 may be arranged such that flanges 14 and first low-melt film 16 remain exposed when tooling segments 20 are closed together. Each spar 10 may be said to define a respective channel 50 via elongate portion 12 and opposing flanges 14. Said channels 50 of spars 10 may be engaged with tooling segments 20 when spars 10 are loaded on to tooling segments 20. For example, a first channel 50a of first spar 10a may be engaged with first tooling segment 22, and a second channel 50b of second spar 10b also may be engaged with first tooling segment 22, but positioned on the opposite end of first tooling segment 22 from first spar 10a. In some examples, first spar 10a is oriented with respect to second spar 10b such that first channel 50a opens towards, or faces, second channel 50b of second spar 10b, as shown in FIGS. 2-3.

In some examples, tooling segments 20 may include features, such as notches 30, for engaging or receiving aspects of spars 10. For example, flanges 14 may be configured to engage with notches 30 on first tooling segment 22 when spars 10a, 10b are seated onto first tooling segment 22. In other examples, notches 30 may be present on a different tooling segment 20 instead of or in addition to first tooling segment 22. In some examples, different features of tooling segments 20 may engage with flanges 14, and/or with different aspects of spars 10. In some examples, spars 10 may be oriented differently with respect to one another, and/or with respect to one or more of tooling segments 20.

Figure 4:
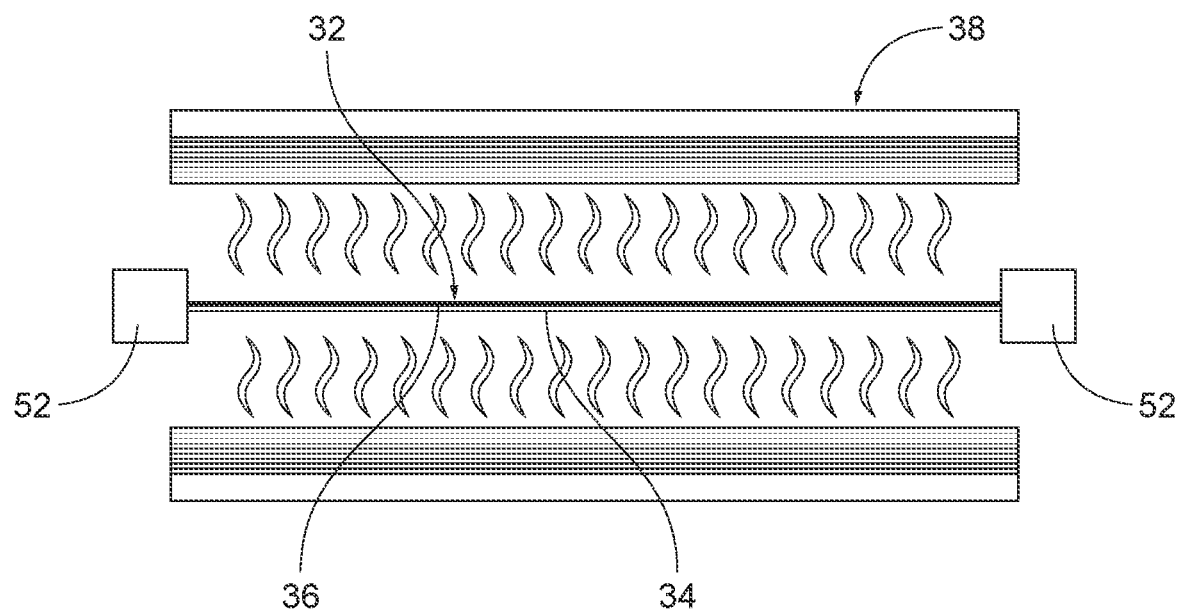
FIG. 4 is a schematic representation of a skin blank coated with a low-melt film, being heated within a heater.
Figure 5:
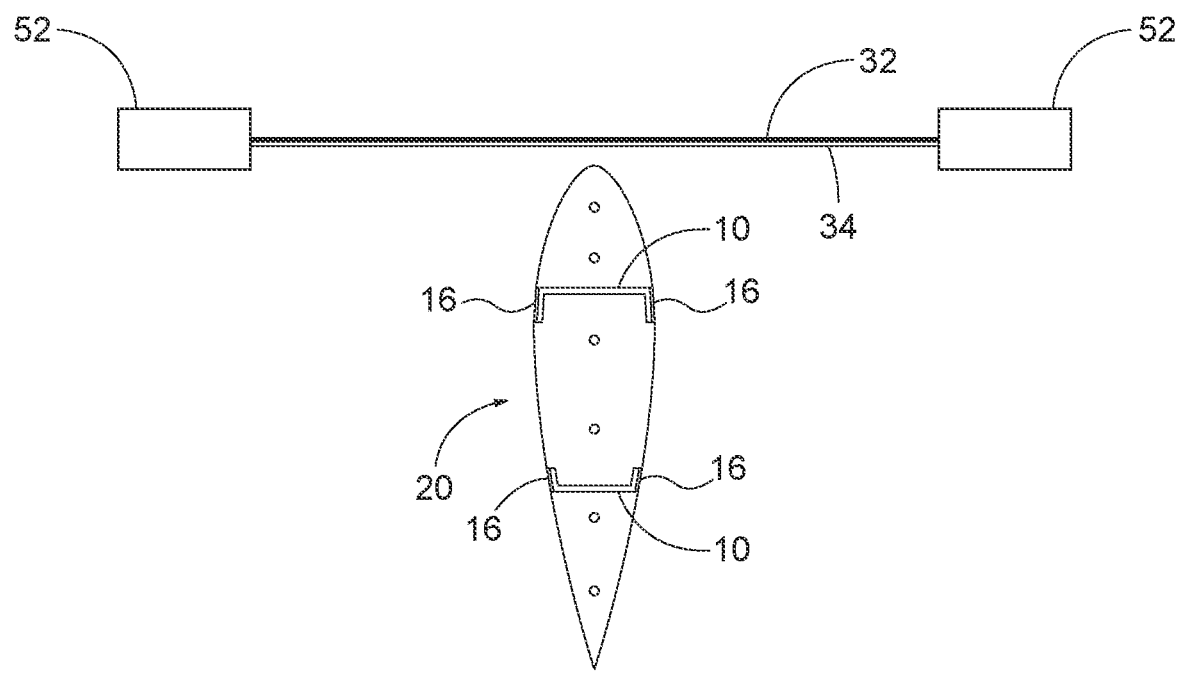
FIG. 5 is a schematic representation of a heated skin blank being positioned with respect to a plurality of tooling segments and spars engaged therewith.
Figure 6:
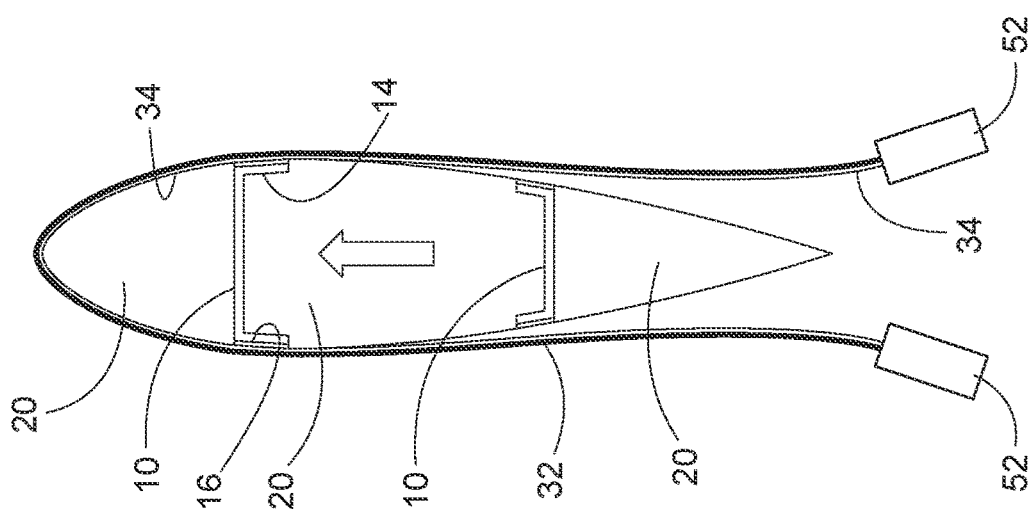
FIG. 6 is a schematic representation of a heated skin blank being draped around a plurality of tooling segments to conform the skin blank to the tooling segments.

A fiber-reinforced consolidated skin blank 32 (which may be referred to herein simply as a skin blank 32) may include a second low-melt film 34 on a first side of skin blank 32. Second low-melt film 34 may be the same type of film as first low-melt film 16 on spars 10, or may be a different type of low-melt film that is compatible to the first low-melt film 16 on spars 10, though in some examples, skin blank 32 may be provided without any second low-melt film 34. Skin blank 32 and any second low-melt film 34 thereon may be heated, such as by an infrared (IR) heating system 38, as schematically represented in FIG. 4. Generally, skin blank 32 is heated to a point where skin blank 32 may be pliable enough to be shaped, such as by being draped around and/or against tooling segments 20, with skin blank 32 being conformed to the shape created by external surface 28 of tooling segments 20. For example, FIG. 5 schematically represents skin blank 32 being positioned relative to tooling segments 20 engaged with tooling segments 20), while FIG. 6 schematically represents skin blank 32 being draped about tooling segments 20 such that skin blank 32 is made to conform to tooling segments 20.

Figure 7:
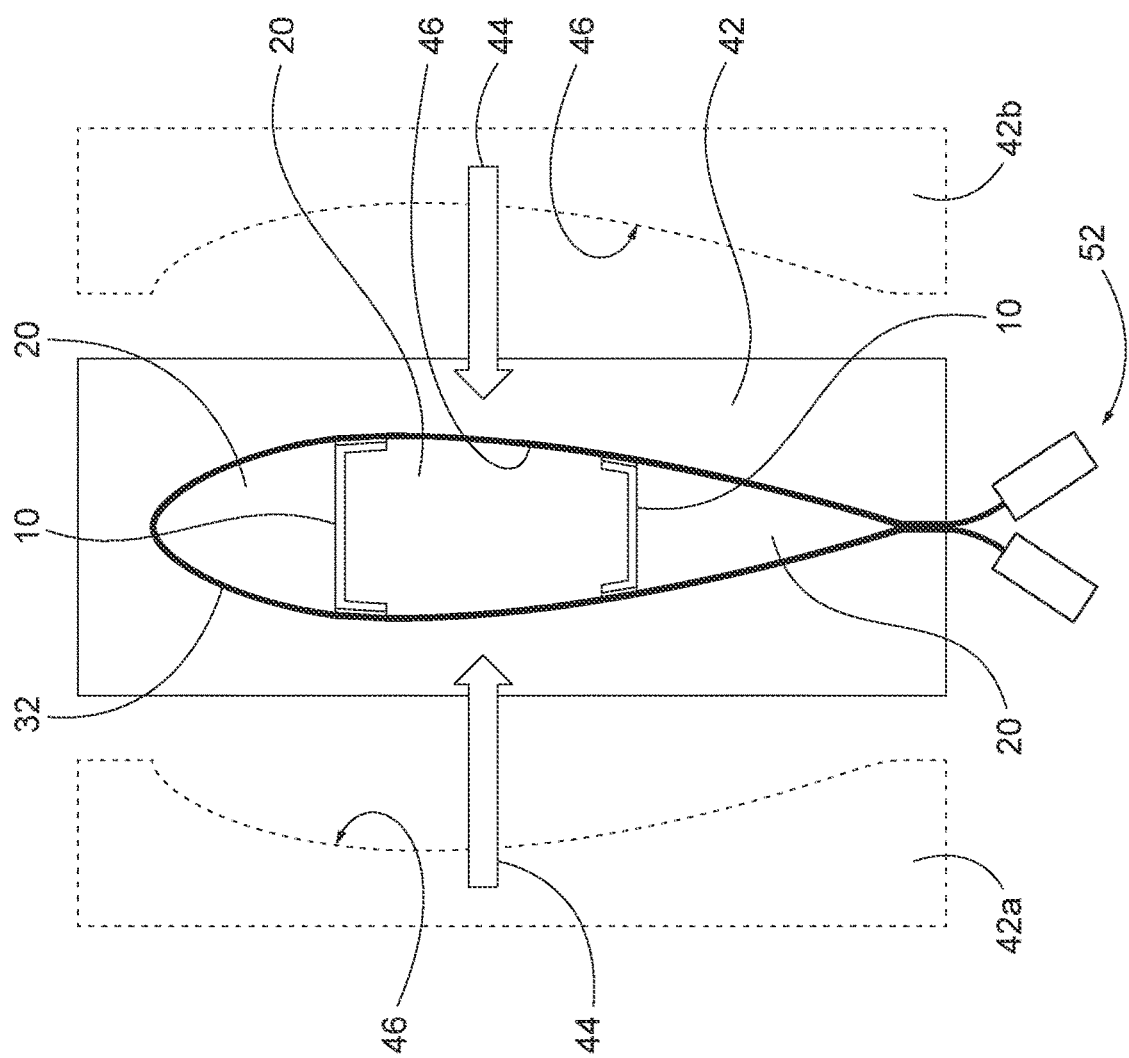
FIG. 7 is a schematic representation of tooling segments, spars, and a skin blank being enclosed within a stamp press for stamp-forming.
Figure 9:
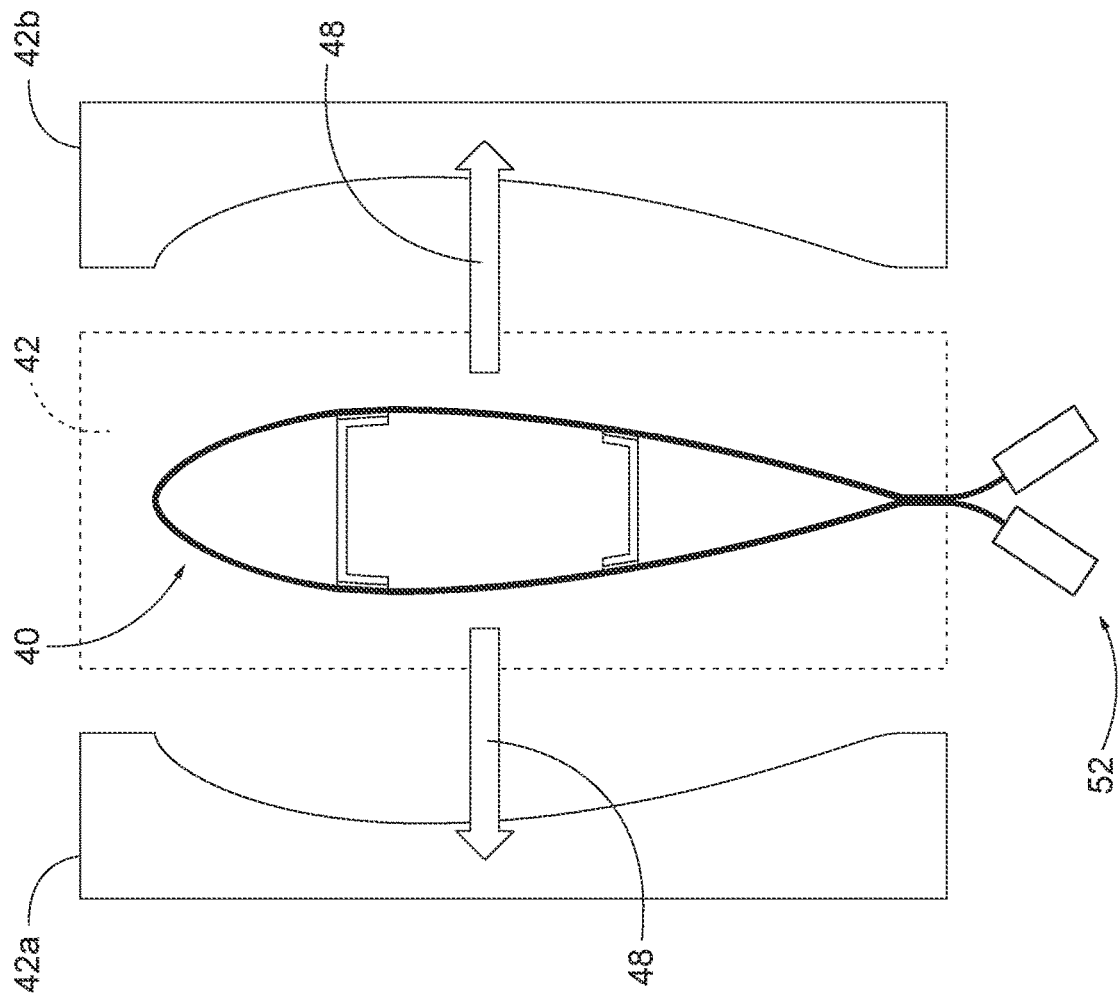
FIG. 9 is a schematic representation of the stamp press of FIGS. 7-8 being opened away from the tooling segments, skin, and spars.
Figure 8:
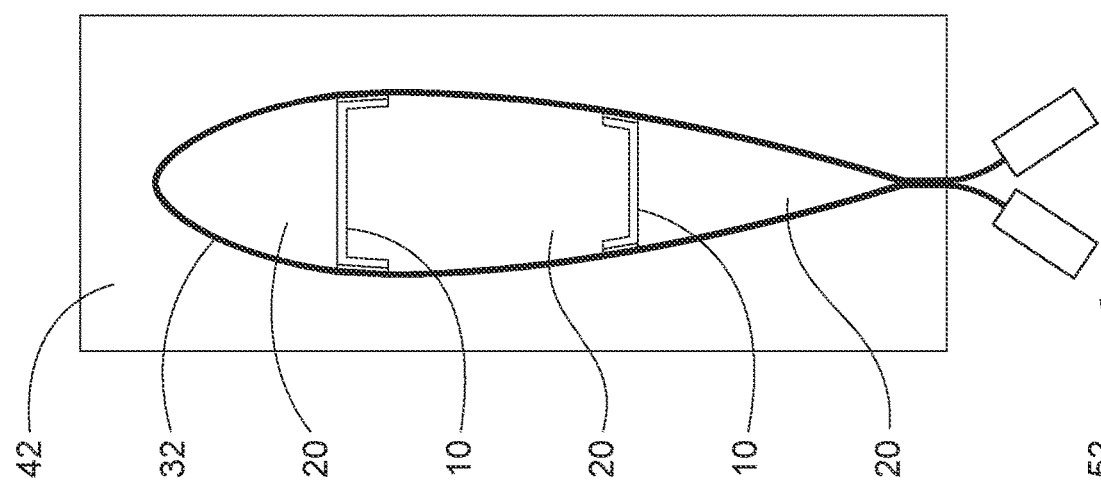
FIG. 8 is a schematic representation of the stamp press of FIG. 7, having been enclosed around the tooling segments, spars, and skin blank.

To complete a composite assembly 40 of skin blank 32 and one or more spars 10 (see FIG. 9), a stamp press 42 may be closed around skin blank 32 and spars 10, and skin blank 32 and spars 10 may be co-consolidated within stamp press 42. For example, FIG. 7 schematically represents a two-part stamp press 42, which is indicated as having two halves 42a, 42b, though other configurations and types of stamp presses also are within the scope of the present disclosure. Stamp press halves 42a, 42b are shown in an open configuration in dashed line in FIG. 7, and then moved towards skin blank 32 and tooling segments 20, as indicated by arrows 44. Stamp press 42 is indicated in solid lines in FIG. 7 having been closed around skin blank 32 as draped onto tooling segments 20. Stamp press 42 (e.g., custom-shaped molds of stamp press 42) generally defines a recess, or cavity 46 between halves 42a, 42b that is configured to receive tooling segments 20 and skin blank 32 therein. Cavity 46 generally has a complementary shape to that of tooling segments 20 such that skin blank 32 is pressed on one side by stamp press 42 and experiences counter pressure from tooling segments 20 against a first side 36 of skin blank 32. In this manner, skin blank 32 is pressed into its desired final shape while at a temperature sufficiently high so as to allow shaping of skin blank 32, and skin blank 32 is configured to retain this desired shape once it is consolidated and removed from stamp press 42 (e.g., once skin blank 32 is transitioned to a formed skin via consolidation). FIG. 8 schematically represents skin blank 32, tooling segments 20, and spars 10 enclosed within stamp press 42, while FIG. 9 schematically represents removal of stamp press 42 by moving halves 42a, 42b away from composite assembly 40 formed from co-consolidating skin blank 32 and spars 10 (indicated by arrows 48). In FIG. 9, stamp press halves 42a, 42b are illustrated in solid lines in an open configuration and are illustrated in dashed lines as closed around composite assembly 40. Tooling segments 20 may then be removed from the resulting composite assembly 40. While FIGS. 7-9 illustrate stamp press 42 in the form of two halves 42a, 42b that move towards and away from skin blank 32 and tooling segments 20 to press or release skin blank 32 or skin and tooling segments 20, respectively, in other examples within the scope of the present disclosure, stamp press 42 may have different configurations and/or orientations with respect to skin blank 32 and tooling segments 20.

Figure 10:
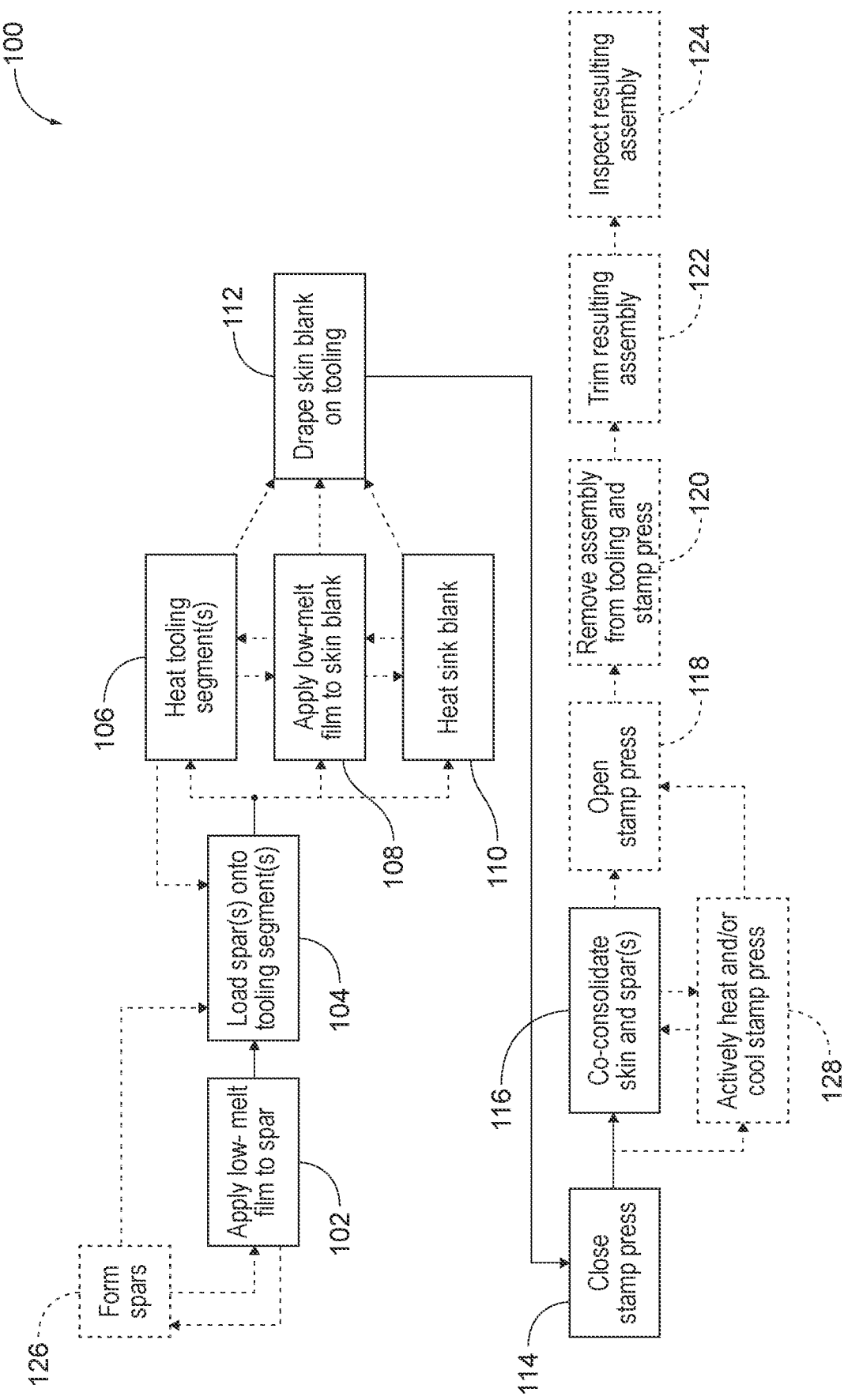
FIG. 10 is a schematic flowchart diagram representing methods of stamp-forming composite assemblies according to the present disclosure.

FIG. 10 schematically provides a flowchart that represents illustrative, non-exclusive examples of methods 100 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps (and orders of the steps) are within the scope of the present disclosure, including methods having greater than or fewer than the number of steps illustrated, as understood from the discussions herein. Steps of methods 100 may be described with reference to the schematic representations of FIGS. 1-9 for illustrative purposes, but are not limited to methods 100.

Methods 100 of stamp-forming a fiber-reinforced thermoplastic composite assembly include applying a first low-melt film (e.g., first low-melt film 16) on at least one interface surface (e.g., interface surface 18) of at least one spar (e.g., spar 10), at 102. In such methods 100, the spars are formed of fiber-reinforced thermoplastic composite materials. Once the first low-melt film is applied to the spars, the spars are loaded onto one or more tooling segments (e.g., tooling segments 20), at 104, such that the interface surfaces of the spars are facing away from the tooling segments. For example, while other aspects of the spars may be enclosed within the tooling segments (e.g., elongated portions 12, as best seen in FIG. 3), the interface surfaces are not enclosed by the tooling segments at this step, such that the first low-melt film on the interface surfaces is exposed even when the tooling segments are assembled together. In some examples, the spars may be engaged with the tooling segments such that the interface surfaces of the spars are substantially flush with the external surface of the tooling segments. In some examples, loading the spars onto the tooling segments at 104 includes closing the tooling segments together, such that two or more tooling segments are engaged with one another. In some examples, portions of one or more spars are sandwiched or clamped between adjacent tooling segments as they are loaded onto the tooling segments and as the tooling segments are closed together at 104. For example, loading the spars on the tooling segments at 104 may include loading a first spar on a first tooling segment, loading a second spar on the first tooling segment, and/or loading a second spar on a second tooling segment. In such examples, loading the spars on the tooling segments at 104 also may include bringing the first tooling segment and the second tooling segment together to close the first and second tooling segments together, thereby sandwiching or clamping the second spar between the first and second tooling segments. Similarly, loading the spars on the tooling segments at 104 may include bringing a third tooling segment together with the first tooling segment to sandwich or clamp the first spar between the first tooling segment and the third tooling segment.

Methods 100 also may include heating the tooling segments, the spars, the interface surfaces of the spars, and/or an ambient temperature of a location where the tooling segments are located, at 106, such that the first low-melt film on the spars is brought up to a first temperature that is above a crystallization temperature of the first low-melt film and below a melt temperature of a thermoplastic spar resin of the spar. In some examples, the heating at 106 results in heating the tooling segments and/or the first low-melt film to a temperature near the melting temperature of the first low-melt film. By limiting the temperature to which the tooling segments and spars are heated at 106, methods 100 may be configured to heat the first low-melt film enough to consolidate it together, without deconsolidating the spars in some examples. This may increase resistance to flaws in the resulting composite assembly. The heating at 106 may be a localized heating step configured to heat just the first low-melt film and interface surfaces of the spars, or the heating at 106 may be a generalized heating step configured to heat the entire tooling segment assembly and/or the entire spars loaded therein. Additionally or alternatively, the heating at 106 may include actively heating one or more of the tooling segments. In some examples, methods 100 include cooling (e.g., actively cooling) the tooling segments, at one or more time periods during the process. In some examples, the heating at 106 may be performed before the spars are loaded on the tooling segments at 104.

A second low-melt film (e.g., second low-melt film 34) may be applied to a fiber-reinforced thermoplastic skin blank, at 108. In some methods 100, the second low-melt film is the same material as used for the first low-melt film applied to the interface surfaces of the spars, though in other examples, different films may be applied at 102 and 108 to the spars and skin blank, respectively. In some examples, the second low-melt film may be applied at 108 to an entire surface, or side, of the skin blank. In other examples, the second low-melt film may be applied to just a portion of a surface or side of the skin blank. For example, the second low-melt film may be applied in the areas of the skin blank that are configured to contact the first low-melt film applied to the spars. In some examples, the skin blank may be provided without any second low-melt film thereon. Once any second-low melt film is applied to the skin blank at 108 (which will generally just be applied to one side of the skin blank, just as first side 36), the skin blank and any second low-melt film are heated, at 110. In some examples, heating the skin blank at 110 may be performed using an infrared (IR) heater (e.g., IR heating system 38). Generally, the heating the skin blank at 110 will be performed to raise the temperature of the skin blank to a second temperature that is above a melting temperature of the thermoplastic skin resin used in the skin blank. Thus, the heating at 110 may cause the skin blank to at least partially deconsolidate, thereby resulting in imparting flexibility to the skin blank such that it may be shaped as desired. Heating the skin blank at 110 may be performed simultaneously with the heating the tooling segments at 106, or one heating step may be performed before or after the other. In some examples, the skin blank may be suspended and/or tensioned before and/or during the heating the skin blank at 110.

Once the skin blank is sufficiently heated at 110 and the interface surfaces of the spars are sufficiently heated at 106, the skin blank is placed, or draped, around the tooling segments, at 112 (as shown schematically in FIGS. 5-6). In some examples, the draping the skin blank around the tooling segments at 112 raises a film temperature of the first low-melt film on the interface surfaces of the spars above the film melting point, thereby melting the first low-melt film. As the skin blank is draped around the tooling segments at 112, tension is applied to the ends of the skin blank, such that the skin blank is caused to conform to the shape defined by the external surface of the tooling segments. For the draping the skin blank at 112, the skin blank and the tooling segments are positioned with respect to one another such that the first side of the skin blank with the second low-melt film thereon (if present) is facing the external surface of the tooling segments. In this manner, as the skin blank is draped around the tooling segments at 112, at least some of any second low-melt film on the skin blank is made to contact the first low-melt film on the interface surfaces of the spars engaged with the tooling segments.

Various arrangements are within the scope of the present disclosure for draping the skin blank around the tooling segments at 112. For example, for the draping at 112, the skin blank and the tooling segments may be positioned with respect to one another such that the skin blank is positioned above the tooling segments, and then the skin blank is brought down towards the tooling segments and/or the tooling segments are moved up towards the skin blank as the skin blank is made to conform to the tooling segments. In another arrangement, the skin blank may be positioned with respect to the tooling segments such that they are side by side, such as shown schematically in FIG. 11. Draping the skin blank around the tooling segments at 112 generally includes maintaining tension on the skin blank during the draping at 112, such as using a tensioning element 52 shown in FIGS. 5-6. Tensioning elements 52 may be, for example, elements such as grippers or springs, though any suitable mechanism or device may be used for this purpose, as will be appreciated by those of ordinary skill in the art. Tensioning elements 52 generally are coupled to or engaged with opposing ends, or edges, of the skin blank, as shown in the FIGS. 11-12, and are used to hold the skin blank to maintain tension on the skin blank as it is being draped or positioned on or around the tooling segments. In this manner, the tensioning elements may be used to reduce or prevent wrinkles in the resulting composite assembly. In some examples, the tensioning elements may be configured to be rotatable with respect to the skin blank.

Figure 11:
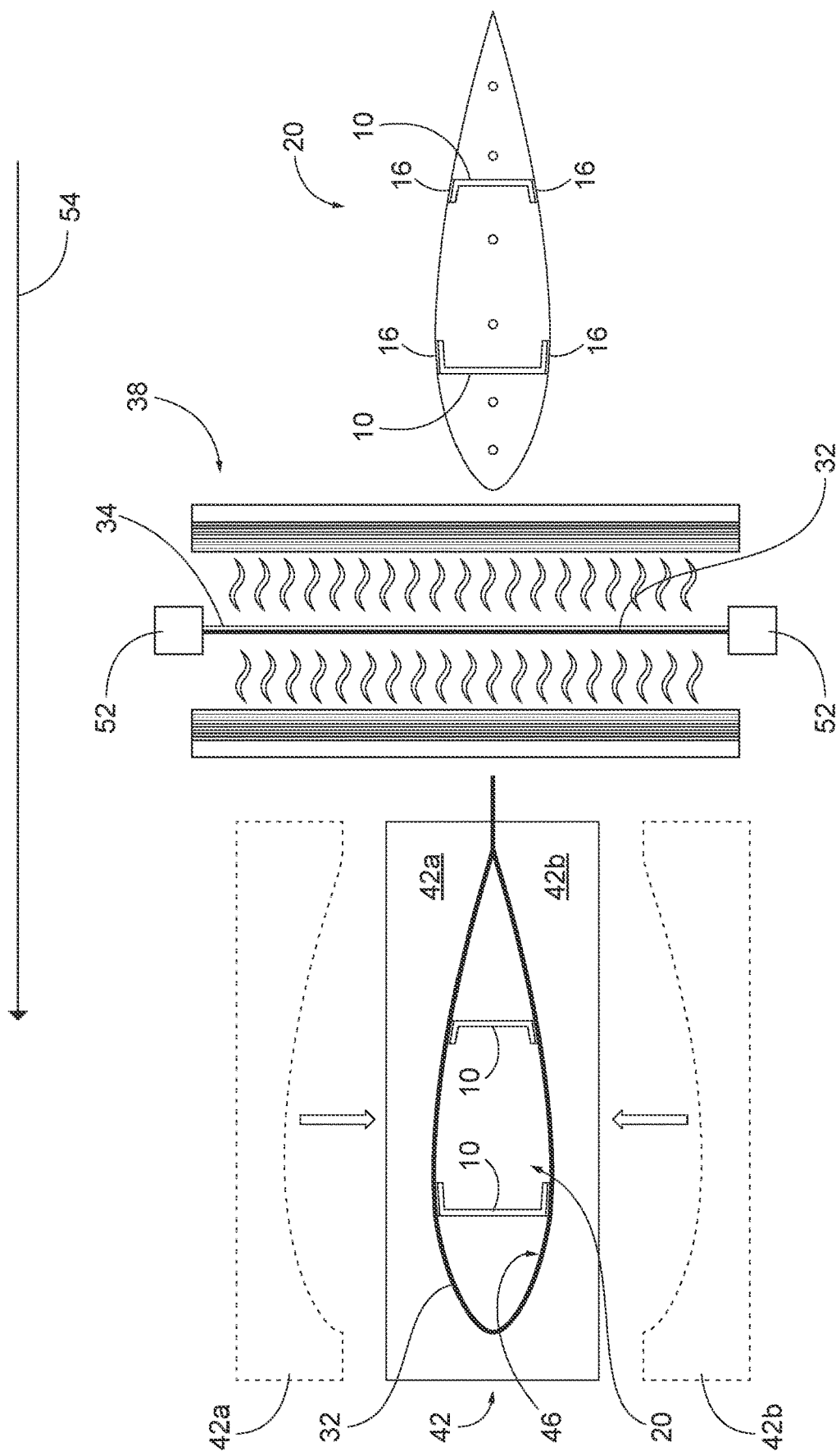
FIG. 11 is a schematic representation of an alternative arrangement of a stamp press and tooling segments according to the present disclosure.
Figure 12:
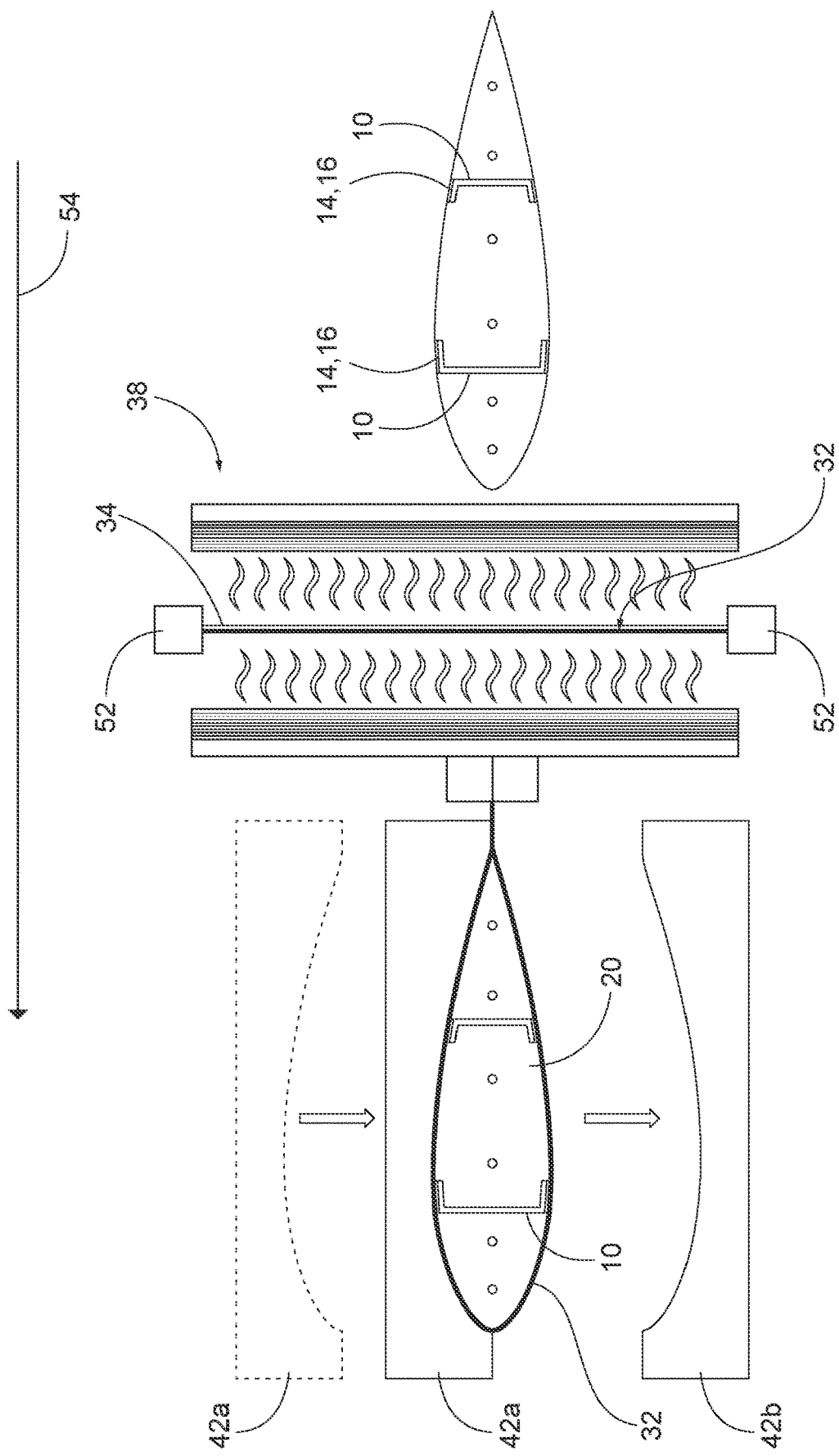
FIG. 12 is a schematic representation of an alternative type of stamp press that may be used to stamp form composite assemblies according to the present disclosure.

With continued reference to FIG. 10, a stamp press (e.g., stamp press 42) then may be closed around the skin blank and the tooling segments, at 114, thereby pressing the skin blank into the tooling segments and pressing at least some of any second low-melt film on the skin blank against the first low-melt film on the interface surfaces of the spars. Closing the stamp press at 114 may be performed in a variety of ways, depending on a given setup used to perform disclosed methods 100. For example, closing the stamp press at 114 may include moving two halves of a stamp press towards each other to enclose the skin blank and tooling segments within a cavity defined between the two stamp press halves. For example, FIGS. 7-9 illustrate stamp press halves 42a, 42b moving towards each other and towards either side of skin blank 32 and tooling segments 20, thereby enclosing skin blank 32 and tooling segments 20 within cavity 46 of stamp press 42. FIG. 11 shows a slightly different arrangement, with stamp press halves 42a, 42b being moved towards the top and bottom sides of skin blank 32 and tooling segments 20. FIG. 12 schematically illustrates yet another example, where the stamp press is closed at 114 by moving one half of the stamp press towards the other (e.g., moving stamp press half 42a towards stamp press half 42b while stamp press half 42b remains stationary). Arrows 54 in FIGS. 11-12 indicate the general direction of the process flow. In the example of FIG. 12, closing the stamp press at 114 includes using one half of the stamp press (e.g., stamp press half 42a) to move the tooling segments and the skin blank towards the second half of the stamp press (e.g., stamp press half 42b), as well. Regardless of the arrangement of the stamp press with respect to the tooling segments and skin blank, generally, any tensioning elements will remain outside of the stamp press as the stamp press is closed around the skin blank and tooling segments at 114. Any tensioning elements used in smoothing the skin blank in place on the tooling segments generally will be removed once the resulting composite assembly is co-consolidated and removed from the stamp press. In other words, the tensioning elements generally will be used in aiding the formation of the resulting composite assembly, but do not themselves form a part of the resulting composite assembly.

The stamp press is remains closed around the skin blank and tooling segments until the skin blank and the spars are co-consolidated within the stamp press, at 116, thereby forming a fiber-reinforced thermoplastic composite assembly of the skin and spars in a single stamp-form action. In some examples, a certain predetermined pressure or force is applied to the stamp press while the skin blank and spars are co-consolidating at 116, and/or the stamp press may be actively heated and/or cooled, at 128, to aid in the consolidation process. In some examples, the heating and/or cooling the stamp press at 128 may be performed to maintain a predetermined temperature of the skin blank for a given period of time, and/or to change the temperature of the skin blank after a prescribed period of time. The co-consolidating at 116 and/or the heating and/or cooling at 128 may be performed before or after the closing the stamp press at 114, and until or before opening the stamp press at 118.

Once the skin blank and the spars have been co-consolidated, the stamp press may be opened, at 118, and the resulting composite assembly may be removed from the stamp press and/or the tooling segments, at 120. For example, the opening the stamp press at 118 may be performed after a current temperature of the skin and the spars is below a crystallization temperature of all of a first thermoplastic resin of the first low-melt film, a second thermoplastic resin of the second low-melt film, a thermoplastic spar resin of the spars, and a thermoplastic skin resin of the skin/skin blank. Additionally or alternatively, the opening the stamp press at 118 may be performed after the resulting fiber-reinforced thermoplastic composite assembly is below a film melting point of the first low-melt film and any second low-melt film. The resulting composite assembly is a closed-contoured aerodynamic torsion box in some methods 100. For example, the resulting composite assembly may be a wing tip, a winglet, a rotor blade for an unmanned aerial vehicle (UAV), a rotor blade for a helicopter tail rotor, a wing, an aileron, a flap, a rudder, and/or smaller control surfaces for UAVs, helicopters, or commercial airplanes.

Some examples of methods 100 additionally include trimming the resulting composite assembly, at 122, and/or non-destructively inspecting the resulting composite assembly, at 124. Additionally or alternatively, methods 100 may include forming the spars, at 126, such that the spars are pre-formed. In various examples, the first low-melt film applied at 102 may be applied to spars that are pre-formed at 126. In some examples, the spars may be stamp-formed at 126. In some methods 100, the first low-melt film is applied to the interface surfaces of the spars during stamp-forming the spars, at 126, while in other examples of methods 100, the first low-melt film may be applied to the interface surfaces of the spars at 104 before or after the spars are stamp-formed (or otherwise formed) at 126. In some examples, forming the spars at 126 may include laying up the spars as a flat blank with the first low-melt film as the surface layer, pre-consolidating the spars in an oven or static press, and then stamp forming the spars. In another example, the forming the spars at 126 may include laying up the spars as a flat blank and then directly stamp-forming the spars. In yet another example, the forming the spars at 126 may include laying up material in the final spar shape using an automated fiber placement device, and then oven or press consolidated, with the low-melt film applied on the interface surfaces of the spars during consolidation. In other examples, the spars may be formed at 126 as described above, but with the low-melt film applied after forming.

The first and/or second low-melt films generally include a thermoplastic resin having a melting temperature that is below the melting temperature of the thermoplastic resin used in the spars (referred to herein as the spar melt temperature of the spar resin). Similarly, the melting temperature of the low-melt film resin generally will be lower than the melting temperature of the thermoplastic skin resin used in the skin blank (referred to herein as the skin melting point of the skin resin). In various examples, the film melting point of the first and/or second low-melt films may be at least 20 degrees F. below the skin melting point, at least 30 degrees F. below the skin melting point, at least 40 degrees F. below the skin melting point, at least 50 degrees F. below the skin melting point, and/or at least 60 degrees F. below the skin melting point. Additionally or alternatively, the film melting point of the first and/or second low-melt films may be at least 20 degrees F. below the spar melting point, at least 30 degrees F. below the spar melting point, at least 40 degrees F. below the spar melting point, at least 50 degrees F. below the spar melting point, and/or at least 60 degrees F. below the spar melting point.

Figure 13:
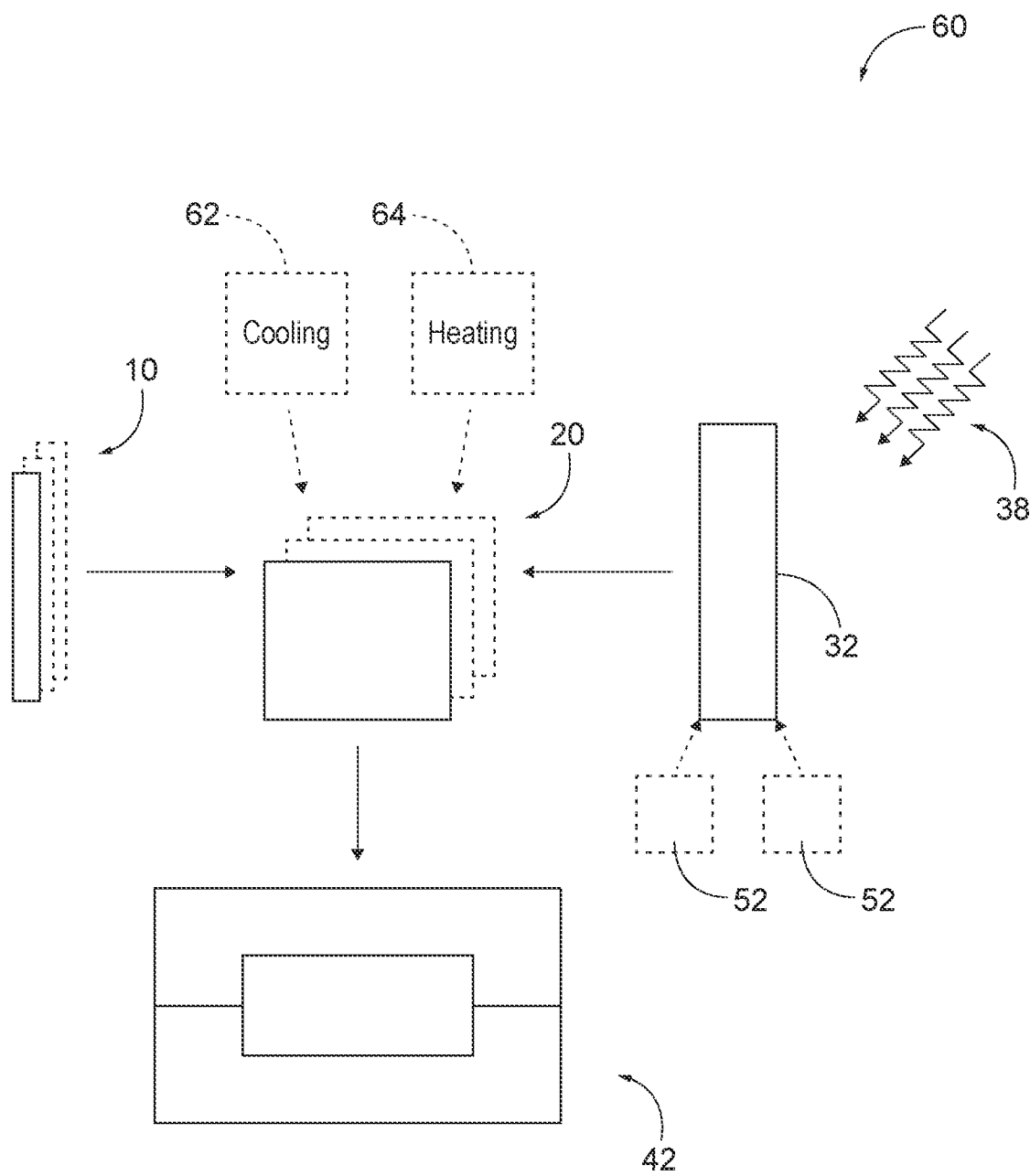
FIG. 13 is a schematic representation of systems for stamp-forming composite assemblies, according to the present disclosure.

FIG. 13 illustrates examples of systems 60 for stamp-forming a fiber-reinforced thermoplastic composite assembly. Systems 60 generally include a plurality of tooling segments 20 configured to position at least one pre-formed spar 10 for a stamp-forming process, an infrared heater 38, a tensioning element 52, and a stamp press 42. As disclosed herein, heater 38 is configured to heat a fiber-reinforced thermoplastic consolidated skin blank to a temperature above a skin melting point of skin blank resin. Tensioning elements 52 maintain tension on skin blank 32 as it is draped around tooling segments 20, and stamp press 42 is configured to be closed around skin blank 32 and tooling segments 20 such that stamp press 42 is configured to press skin blank 32 onto the plurality of tooling segments 20 and against the low melt film on at least one pre-formed spar 10 to co-consolidate skin blank 32 with one or more spars 10, thereby forming the resulting fiber-reinforced thermoplastic composite assembly. In some examples, system 60 includes a cooling system 62 configured to actively cool tooling segments 20 and/or molds of stamp press 42, and/or a heating system 64 configured to actively heat tooling segments 20 and/or molds of stamp press 42. In some systems 60, a single temperature control system may be configured to actively heat and cool tooling segments 20 (and/or spars 10 engaged therewith).

Illustrative, non-exclusive examples of inventive subject matter according to the present disclosure are described in the following enumerated paragraphs:

A1. A method of stamp-forming a fiber-reinforced thermoplastic composite assembly, the method comprising:

applying a first low-melt film on at least one interface surface of at least one spar, wherein each spar of the at least one spar is formed of fiber-reinforced thermoplastic composite materials;

loading the at least one spar onto at least one tooling segment such that the at least one interface surface is facing away from the at least one tooling segment;

heating the at least one tooling segment to cause the first low-melt film to reach a first temperature, wherein the first temperature is above a crystallization temperature of the first low-melt film, and wherein the first temperature is below a melt temperature of a thermoplastic spar resin of the at least one spar;

heating a skin blank to a second temperature, wherein the second temperature is above a melt temperature of a thermoplastic skin resin of the skin blank, and wherein the skin blank is a fiber-reinforced thermoplastic skin blank;

draping the skin blank around the at least one tooling segment such that a first side of the skin blank faces an external surface of the at least one tooling segment;

closing a stamp press around the skin blank and the at least one tooling segment, thereby pressing the skin blank into the at least one tooling segment and pressing the skin blank against the first low-melt film on the at least one interface surface; and co-consolidating the skin blank and the at least one spar within the stamp press, thereby forming the fiber-reinforced thermoplastic composite assembly.

A1.1. The method of paragraph A1, further comprising removing the fiber-reinforced thermoplastic composite assembly from the at least one tooling segment.

A1.2. The method of paragraph A1 or A1.1, wherein the first low-melt film comprises a first thermoplastic resin having a first film melt temperature that is below a spar melt temperature of the thermoplastic spar resin of the at least one spar.

A1.3. The method of any of paragraphs A1-A1.2, wherein each spar of the at least one spar comprises an elongate portion extending between two opposing flanges.

A1.4. The method of paragraph A1.3, wherein the at least one interface surface comprises an outer surface of each of the two opposing flanges of the at least one spar.

A1.5. The method of paragraph A1.4, wherein the loading the at least one spar onto the at least one tooling segment comprises loading the at least one spar such that the outer surface of each of the two opposing flanges of the at least one spar is exposed and facing away from the at least one tooling segment.

A1.6. The method of any of paragraphs A1-A1.5, further comprising opening the stamp press to remove the at least one tooling segment and the fiber-reinforced thermoplastic composite assembly.

A1.7. The method of paragraph A1.6, wherein the opening the stamp press is performed after the co-consolidating the skin blank and the at least one spar.

A1.8. The method of any of paragraphs A1.6-A1.7, wherein the opening the stamp press is performed after a current temperature of the fiber-reinforced thermoplastic composite assembly is below a crystallization temperature of all of a/the first thermoplastic resin of the first low-melt film, a/the second thermoplastic resin of a/the second low-melt film, the thermoplastic spar resin, and a thermoplastic skin resin of the skin blank.

A1.9. The method of any of paragraphs A1-A1.8, further comprising applying a/the second low-melt film on the first side of the skin blank.

A1.10. The method of paragraph A1.9, wherein the heating the skin blank comprises heating the skin blank with the second low-melt film to the second temperature.

A1.11. The method of paragraph A1.9 or A.10, wherein the draping the skin blank comprises draping the skin blank with the second low-melt film around the at least one tooling segment such that the first side of the skin blank faces the external surface of the at least one tooling segment, with at least a portion of the second low-melt film contacting the first low-melt film on the at least one interface surface.

A1.12. The method of any of paragraphs A1.9-A1.11, wherein the closing the stamp press comprises closing the stamp press around the skin blank and the at least one tooling segment, thereby pressing at least some of the second low-melt film against the first low-melt film on the at least one interface surface.

A1.13. The method of any of paragraphs A1.9-A1.12, wherein the second low-melt film comprises a second thermoplastic resin having a second film melt temperature that is below the spar melt temperature of the thermoplastic spar resin of the at least one spar.

A1.14. The method of paragraph 1.13, wherein the second thermoplastic resin is the same as a/the first thermoplastic resin of the first low-melt film.

A2. The method of any of paragraphs A1-A1.14, further comprising forming the at least one spar.

A3. The method of paragraph A2, wherein the forming the at least one spar comprises stamp-forming the at least one spar.

A4. The method of paragraph A3, wherein the stamp-forming the at least one spar results in the first low-melt film being applied to an/the outer surface of each of the two opposing flanges of each spar of the at least one spar.

A4.1. The method of paragraph A3 or A4, wherein the stamp-forming the at least one spar results in the first low-melt film being applied to the at least one interface surface of the at least one spar.

A5. The method of any of paragraphs A1-A4.1, wherein the at least one tooling segment comprises a first tooling segment, and wherein the loading the at least one spar comprises loading a first spar of the at least one spar on the first tooling segment.

A6. The method of any of paragraphs A1-A5, wherein the at least one tooling segment comprises a second tooling segment, and wherein the loading the at least one spar comprises loading a second spar of the at least one spar on the second tooling segment.

A7. The method of any of paragraphs A1-A6, wherein the loading the at least one spar comprises loading a/the second spar of the at least one spar on a/the first tooling segment.

A8. The method of any of paragraphs A5-A7, further comprising bringing the first tooling segment and a/the second tooling segments together to close the first and second tooling segments together.

A9. The method of any of paragraphs A5-A8, wherein the loading the at least one spar comprises sandwiching the first spar between the first tooling segment and a third tooling segment.

A10. The method of any of paragraphs A5-A9, wherein the loading the at least one spar comprises sandwiching a/the second spar between the first tooling segment and a/the second tooling segment.

A11. The method of any of paragraphs A5-A10, wherein the loading the at least one spar comprises loading the first spar and a/the second spar such that a first channel of the first spar faces a second channel of the second spar.

A12. The method of any of paragraphs A5-A11, wherein a/the first channel of the first spar engages with the first tooling segment.

A13. The method of any of paragraphs A5-A12, wherein a/the second channel of a/the second spar engages with the first tooling segment opposite the first spar.

A14. The method of any of paragraphs A5-A13, wherein the at least one tooling segment comprises a plurality of tooling segments including a/the first tooling segment, a/the second tooling segment, and/or a/the third tooling segment.

A15. The method of any of paragraphs A1-A14, further comprising actively cooling the at least one tooling segment.

A15.1. The method of any of paragraphs A1-A15, further comprising actively cooling one or more tools of the stamp press.

A16. The method of any of paragraphs A1-A15.1, further comprising actively heating the at least one tooling segment.

A16.1. The method of any of paragraphs A1-A16, further comprising actively heating one or more tools of the stamp press.

A17. The method of any of paragraphs A1-A16.1, wherein the heating the skin blank comprises infrared heating.

A18. The method of any of paragraphs A1-A17, wherein a/the second low-melt film is engaged with the skin blank during the heating the skin blank.

A19. The method of any of paragraphs A1-A18, further comprising positioning the skin blank and the at least one tooling segment with respect to one another such that the skin blank is positioned above the at least one tooling segment.

A20. The method of any of paragraphs A1-A18, further comprising positioning the skin blank and the at least one tooling segment with respect to each other such that they are side by side.

A21. The method of any of paragraphs A1-A20, wherein the draping the skin blank comprises lowering the skin blank towards the at least one tooling segment.

A22. The method of any of paragraphs A1-A20, wherein the draping the skin blank comprises raising the at least one tooling segment towards the skin blank.

A23. The method of any of paragraphs A1-A22, wherein the draping the skin blank comprises maintaining tension on the skin blank during the draping the skin blank, using a tensioning element.

A23.1. The method of paragraph A23, wherein the tensioning element comprises grippers or springs.

A24. The method of any of paragraphs A1-A23.1, further comprising trimming the fiber-reinforced thermoplastic composite assembly.

A25. The method of any of paragraphs A1-A24, further comprising non-destructively inspecting the fiber-reinforced thermoplastic composite assembly.

A26. The method of any of paragraphs A1-A25, further comprising maintaining a predetermined pressure and/or temperature on the skin blank and the at least one tooling segment after the closing the stamp press, during the co-consolidating, and before opening the stamp press.

A27. The method of any of paragraphs A1-A26, wherein the fiber-reinforced thermoplastic composite assembly is a closed-contoured aerodynamic torsion box.

A28. The method of any of paragraphs A1-A27, wherein the closing the stamp press comprises moving two halves of the stamp press towards one another and towards the at least one tooling segment.

A29. The method of any of paragraphs A1-A27, wherein the closing the stamp press comprises moving a first half of the stamp press towards a second half of the stamp press.

A30. The method of any of paragraphs A1-A29, wherein the closing the stamp press comprises using a/the first half of the stamp press to move the at least one tooling segment towards a/the second half of the stamp press.

A31. The method of any of paragraphs A1-A30, comprising opening the stamp press, wherein the opening the stamp press is performed after the fiber-reinforced thermoplastic composite assembly is below a film melting point of the first low-melt film and/or a/the second low-melt film.

A32. The method of any of paragraphs A1-A31, wherein the film melting point of the first low-melt film and/or a/the second low-melt film is lower than the skin melting point of the skin blank resin.

A33. The method of paragraph A21, wherein the film melting point is at least 20 degrees F. below the skin melting point, at least 30 degrees F. below the skin melting point, at least 40 degrees F. below the skin melting point, at least 50 degrees F. below the skin melting point, and/or at least 60 degrees F. below the skin melting point.

A34. The method of any of paragraphs A1-A33, wherein the heating the skin blank is performed before the closing the stamp press.

A35. The method of any of paragraphs A1-A34, wherein the draping the skin blank around the at least one tooling segment raises a film temperature of the first low-melt film above the film melting point, thereby melting the first low-melt film.

A36. The method of any of paragraphs A1-A35, wherein the fiber-reinforced thermoplastic composite assembly is a wing tip, a winglet, a rotor blade for an unmanned aerial vehicle (UAV), a rotor blade for a helicopter tail rotor, a wing, an aileron, a flap, a rudder, and/or smaller control surfaces for UAVs, helicopters, or commercial airplanes.

A37. The method of any of paragraphs A1-A36, wherein the at least one spar is a pre-formed spar.

A38. The method of any of paragraphs A1-A37, wherein the stamp press comprises a/the first half and a/the second half that together form a cavity configured to receive a/the plurality of tooling segments, the at least one interface surface of the at least one spar, and the skin blank therein.

B1. A closed-contoured torsion box made according to the method of any of paragraphs A1-A38.

B2. A wing tip, a winglet, a rotor blade for an unmanned aerial vehicle (UAV), a rotor blade for a helicopter tail rotor, a wing, an aileron, a flap, a rudder, and/or smaller control surfaces for UAVs, helicopters, or commercial airplanes, made according to the method of any of paragraphs A1-A38.

C1. A system for stamp-forming a fiber-reinforced thermoplastic composite assembly, the system comprising:
a plurality of tooling segments configured to position at least one pre-formed spar for a stamp-forming process;
an infrared heater configured to heat a fiber-reinforced thermoplastic consolidated skin blank to a temperature above a skin melting point of a thermoplastic skin resin of the skin blank;
a tensioning element configured to maintain tension on the skin blank as the skin blank is draped around the plurality of tooling segments such that the skin blank faces an external surface of the plurality of tooling segments; and
a stamp press configured to be closed around the skin blank and the plurality of tooling segments, such that the stamp press is configured to press the skin blank onto the plurality of tooling segments and against the low-melt film on the at least one pre-formed spar to co-consolidate the skin blank with the at least one pre-formed spar, thereby forming the fiber-reinforced thermoplastic composite assembly.

C2. The system of paragraph C1, wherein the stamp-forming process comprises the method of any of paragraphs A1-A38.

C3. The system of any of paragraphs C1-C2, wherein the low-melt film is applied to an outer surface of each of two opposing flanges of each spar of the at least one pre-formed spar.

C3.1. The system of any of paragraphs C1-C3, wherein the low-melt film is applied to at least one interface surface of the at least one pre-formed spar.

C4. The system of any of paragraphs C1-C3.1, wherein the plurality of tooling segments comprises a first tooling segment, a second tooling segment, and a third tooling segment, with the first tooling segment configured to be positioned between the second tooling segment and the third tooling segment.

C5. The system of paragraph C4, wherein a first spar of the at least one pre-formed spar is configured to be loaded onto the plurality of tooling segments such that the first spar is sandwiched between the first tooling segment and the third tooling segment.

C6. The system of any of paragraphs C4-C5, wherein a second spar of the at least one pre-formed spar is configured to be loaded onto the plurality of tooling segments such that the second spar is sandwiched between the first tooling segment and the second tooling segment.

C7. The system of any of paragraphs C4-C6, wherein the plurality of tooling segments are configured to be engaged with one another and with the at least one pre-formed spar such that a first channel of a/the first spar of the at least one pre-formed spar faces a second channel of a/the second spar of the at least one pre-formed spar.

C8. The system of any of paragraphs C1-C7, wherein the plurality of tooling segments are configured to position the at least one pre-formed spar such that outer surfaces of opposing flanges of each respective spar face outwardly from the external surface of the plurality of tooling segments.

C8.1. The system of any of paragraphs C1-C8, wherein the plurality of tooling segments are configured to position the at least one pre-formed spar such that at least one interface surface of each respective spar faces outwardly from the external surface of the plurality of tooling segments.

C9. The system of any of paragraphs C1-C8.1, further comprising a cooling system configured to actively cool the plurality of tooling segments.

C10. The system of any of paragraphs C1-C79, further comprising a heating system configured to actively heat the plurality of tooling segments.

C11. The system of any of paragraphs C1-C10, wherein the plurality of tooling segments are configured to be moved towards the skin blank as the skin blank is draped around the tooling segment.

C12. The system of any of paragraphs C1-C11, wherein the stamp press is configured to maintain a predetermined pressure and/or temperature on the skin blank and the plurality of tooling segments for a period of time sufficient to co-consolidate the skin blank and the at least one pre-formed spar.

C13. The system of any of paragraphs C1-C12, wherein the stamp press comprises a first half and a second half that together form a cavity configured to receive the plurality of tooling segments therein.

C14. The system of paragraph C13, wherein the first half and the second half are configured to be moved towards one another to close the stamp press around the plurality of tooling segments.

C15. The system of paragraph C13, wherein the first half is configured to move itself and the plurality of tooling segments towards the second half to close the stamp press around the plurality of tooling segments.

D1. Use of the system of any of paragraphs C1-C15 to make a closed-contoured torsion box.

D2. Use of the system of any of paragraphs C1-C15 to make a wing tip, a winglet, a rotor blade for an unmanned aerial vehicle (UAV), a rotor blade for a helicopter tail rotor, a wing, an aileron, a flap, a rudder, and/or smaller control surfaces for UAVs, helicopters, or commercial airplanes.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A method of stamp-forming a fiber-reinforced thermoplastic composite assembly, the method comprising:
applying a first low-melt film on at least one interface surface of at least one spar, wherein each spar of the at least one spar is formed of fiber-reinforced thermoplastic composite materials;
loading the at least one spar onto at least one tooling segment such that the at least one interface surface is facing away from the at least one tooling segment;
heating the at least one tooling segment to cause the first low-melt film to reach a first temperature, wherein the first temperature is above a crystallization temperature of the first low-melt film, and wherein the first temperature is below a melt temperature of a thermoplastic spar resin of the at least one spar;
heating a skin blank to a second temperature, wherein the second temperature is above a melt temperature of a thermoplastic skin resin of the skin blank, and wherein the skin blank is a fiber-reinforced thermoplastic skin blank;
draping the skin blank around the at least one tooling segment such that a first side of the skin blank faces an external surface of the at least one tooling segment;
closing a stamp press around the skin blank and the at least one tooling segment, thereby pressing the skin blank into the at least one tooling segment and pressing the skin blank against the first low-melt film on the at least one interface surface, wherein closing the stamp press around the skin blank comprises causing the skin blank to conform to the at least one tooling segment; and
co-consolidating the skin blank and the at least one spar within the stamp press, thereby forming the fiber-reinforced thermoplastic composite assembly.

2. The method according to claim 1, wherein the first low-melt film comprises a first thermoplastic resin having a first film melt temperature that is below the spar melt temperature of the thermoplastic spar resin.

3. The method according to claim 1, wherein each spar of the at least one spar comprises an elongate portion extending between two opposing flanges, and wherein the at least one interface surface comprises an outer surface of each of the two opposing flanges of the at least one spar.

4. The method according to claim 3, wherein the loading the at least one spar onto at least one tooling segment comprises loading the at least one spar such that the outer surface of each of the two opposing flanges of the at least one spar is exposed and facing away from the at least one tooling segment.

5. The method according to claim 1, further comprising opening the stamp press to remove the fiber-reinforced thermoplastic composite assembly, wherein the opening of the stamp press is performed after a current temperature of the fiber-reinforced thermoplastic composite assembly is below the lowest of a crystallization temperature of a first thermoplastic resin of the first low-melt film, a second thermoplastic resin of a second low-melt film on the skin blank, the thermoplastic spar resin, and a thermoplastic skin resin of the skin blank.

6. The method according to claim 1, further comprising stamp-forming the at least one spar, wherein the stamp-forming the at least one spar results in the first low-melt film being applied to an outer surface of each of two opposing flanges of each spar of the at least one spar, and wherein the at least one interface surface comprises the outer surface of each of the two opposing flanges of each spar of the at least one spar.

7. The method according to claim 1, wherein the at least one tooling segment comprises a first tooling segment, a second tooling segment, and a third tooling segment, wherein the loading the at least one spar comprises:
loading a first spar of the at least one spar onto the first tooling segment;
loading a second spar of the at least one spar onto the first tooling segment;
bringing the first tooling segment and the second tooling segments together to close the first and second tooling segments together, thereby sandwiching the second spar between the first tooling segment and the second tooling segment; and
sandwiching the first spar between the first tooling segment and the third tooling segment.

8. The method according to claim 1, wherein the loading the at least one spar comprises loading a first spar of the at least one spar and loading a second spar of the at least one spar, such that a first channel of the first spar faces a second channel of the second spar, wherein the first channel of the first spar engages with a first tooling segment of the at least one tooling segment, and wherein the second channel of the second spar engages with the first tooling segment opposite the first spar.

9. The method according to claim 1, wherein the heating the skin blank comprises infrared heating.

10. The method according to claim 1, further comprising applying a second low-melt film on the first side of the skin blank, wherein the second low-melt film is already applied on the skin blank before the heating the skin blank.

11. The method according to claim 1, wherein the draping the skin blank comprises maintaining tension on the skin blank during the draping the skin blank, using a tensioning element.

12. The method according to claim 11, wherein the tensioning element comprises grippers or springs.

13. The method according to claim 1, wherein the fiber-reinforced thermoplastic composite assembly is a closed-contoured aerodynamic torsion box.

14. The method according to claim 1, wherein a film melting point of the first low-melt film is lower than a skin melting point of the skin blank.

15. The method according to claim 1, wherein the draping the skin blank around the at least one tooling segment raises a film temperature of the first low-melt film above a film melting point, thereby melting the first low-melt film.

16. The method according to claim 1, wherein the at least one spar is a pre-formed spar.

* * * * *